May 4, 1965     B. W. BEDELL     3,182,100
MONOFILAMENT POLYAMIDE FISHLINE COMPOSITION
Filed July 21, 1960
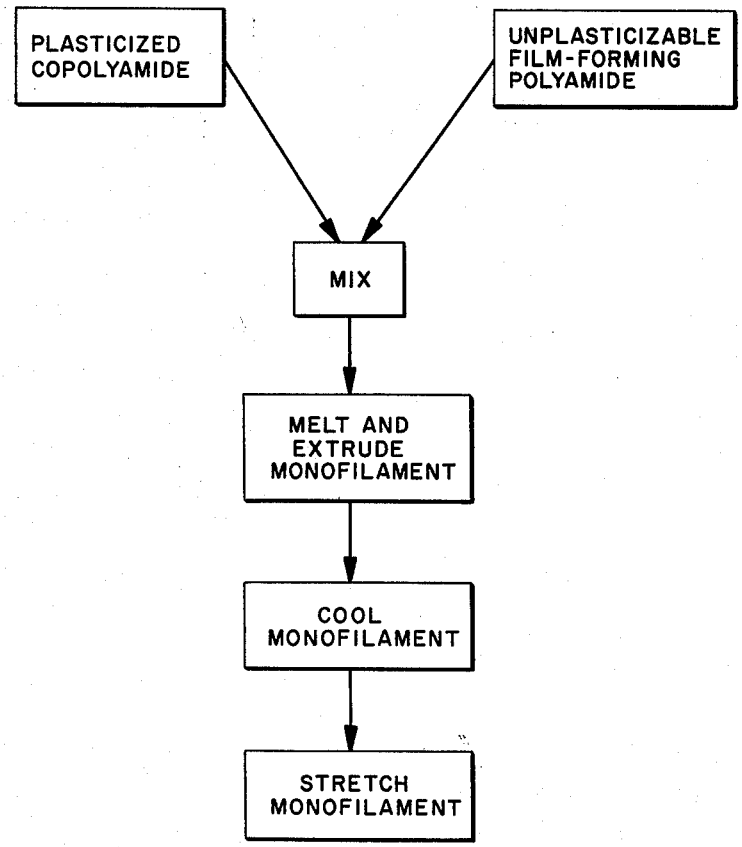
INVENTOR.
BERKLEY W. BEDELL
BY
Meyers & Peterson
ATTORNEYS 3,182,100
MONOFILAMENT POLYAMIDE FISHLINE
COMPOSITION
Berkley W. Bedell, Spirit Lake, Iowa, assignor, by mesne assignments, to Berkley & Company, Inc., Spirit Lake, Iowa, a corporation of Iowa
Filed July 21, 1960, Ser. No. 44,244
13 Claims. (Cl. 260—857)

This invention relates to oriented polyamide structures, and more particularly to polyamide fishlines with new and improved characteristics. The instant disclosure is a continuation-in-part of United States patent application Serial Number 829,527 filed July 27, 1959, in which I was co-inventor.

Certain thermoplastic polyamides, commonly classified under the generic name nylon, have long been known as useful materials for extrusion of monofilament line. These fiber forming, high molecular weight polyamides can be prepared from aminocarboxylic acids, or from diamines and dicarboxylic acids or suitable amide-forming derivatives. It will be appreciated that a great many such condensates can be obtained with properties of the polymers depending on the chemical structure of the chemical building stones. Only a rather small number of these possible polyamides have yet attained any large-scale commercial importance.

In order to express the chemical composition of a polyamide, a numerical system is now generally and very conveniently employed. A two-figure combination would indicate a polyamide made from a diamine and a dicarboxylic acid. The individual numbers signify the numbers of carbon atoms in the diamine and dicarboxylic acid chains respectively, with the diamine number given first. The 66-polymer, for example, is derived from hexamethylene diamine and adipic acid, and a 610-polymer is obtained from hexamethylene diamine and sebacic acid. A 108-polymer would represent the polyamide obtained by a condensation of decamethylene diamine and suberic acid.

When the polyamide is derived from an omega-aminocarboxylic acid, this is indicated by a single figure again referring to the number of carbon atoms in the chain. The 6-polymer is the condensation product of omega-aminocaproic acid or its lactam, the 7-polymer is derived from 7-aminoheptanoic acid, the 8-nylon from 8-aminooctanoic acid or capryl lactam, the 11-polyamide, better known as Rilsan, is derived from 11-aminoundecanoic acid, etc.

In order to distinguish between the different types of products discussed in the following, I will use the following terminology. A simple or straight polyamide or homopolyamide is a polyamide containing only one kind of aminocarboxylic acid or only one diamine/dicarboxylic acid combination. These homopolymers are exemplified by 6-nylon or polycaprolactam, 8-nylon or polycapryl lactam, 66-nylon or hexamethylene diamine/adipic acid polyamide, 610-nylon or hexamethylene sebacamide, etc.

By copolyamide or interpolyamide, we mean a polymer made by simultaneous copolymerization of several different monomers, either aminocarboxylic acids or diamine/dicarboxylic acid pairs or combinations of these, or made by interreaction of at least two different polyamides, in the molten stage and for a sufficient time to establish essentially an equilibrium. These copolyamides are denoted by a combination of the appropriate numbers followed by bracketed numbers indicating the relative proportions used in making the composition. For example, 66/610 (50:50) polymer would indicate a copolyamide containing equal amounts of nylon 66 and 610, and a 6/610/66 (9:9:2) polymer would contain 45% polycaprolactam, 45% polyhexamethylene sebacamide and 10% polyhexamethylene adipamide.

While these distinctions and terminology appear useful and logical in the light of present knowledge, I do not wish to limit my invention by any theories in regard to composition and formation of polymers.

The required properties of monofilaments may vary according to their ultimate usage, but, in certain uses such as fishline, the material must be strong and insoluble in water. Additionally, it is desirable to have a certain degree of flexibility or limpness while minimizing stretchability of a monofilament fishline. At the present time a high percentage of monofilament such as is used for fishing line, is made from 6-nylon also known as the polymer of epsilon caprolactam. Polycaprolactam, however, is quite stiff and hence the practice has developed of permitting a certain percentage of the monomeric lactam to remain in the polymer. Ordinarily, caprolactam is not added to the polymer, but due to the existing polymerization equilibrium, a certain amount of caprolactam—about 6–8%—remains in the finished polymer and would have to be extracted in order to obtain a monomer-free polymer.

The small amount of residual monomer will soften the polymerized product somewhat but, at the same time, will make it weaker. Even with this percentage of monomer, the line is not adequately soft and limp for the best performance and use as a fishline, and there is a tendency for the lactam to leach out of the line during use which will cause further stiffening. Attempts have been made to deliberately increase the lactam monomer content in the polyamide above that which is normally obtained during polymerization or which may remain thereafter in order to impart additional limpness to the material. Here, again, the improvement in limpness subtracts from the strength of the material and, further, the excess monomer is not permanent, but tends to leach out of the line over a period of time.

According to this invention, by adding a plasticized copolyamide or interpolyamide, to a substantially unplasticizable, but otherwise strong, extrudable polyamide, such as polycaprolactam, it is possible to effectively produce a soft and flexible monofilament line while maintaining or even gaining strength over similar line made from homopolymer or copolymer or interpolymer alone, plasticized or unplasticized. Furthermore, in practicing the invention, the beneficial results are obtained without introducing into the line objectionable stretchability.

It is known that copolyamides and interpolyamides can be plasticized by addition of certain plasticizers, although the choice of compatible plasticizers is rather limited. Most homopolyamides on the other hand are essentially unplasticizable by conventional non-toxic and non-irritant plasticizers. Certain phenols will partly dissolve and plasticize 66-nylon, but the plasticizing efficiency is low. Polycaprolactam can be plasticized to a limited degree by caprolactam monomer, but the monomer is water susceptible.

The plasticized copolyamides and interpolymers give products with improved flexibility and are satisfactory for certain wire coating and molding operations where a rubbery type material is desired. However, they are generally unsatisfactory when made into filaments, many molded and extruded items, and fishing line in particular, because of this rubbery quality, and because of the loss of tensile strength caused by the plasticizer addition.

Copolyamides and interpolyamides are in themselves generally more flexible and softer than the homopolyamides. While they may be useful in a number of applications, these copolyamides and interpolyamides are generally unsuitable for fishline because of their somewhat rubbery characteristics, and lack of adequate tensile strength. The amount of increased softness over homopolymers obtained by copolymerization or interpolymerization is also somewhat limited.

The present invention, therefore, comprises producing a soft, flexible polymeric material with improved strength, by physically mixing a plasticized nylon component with a substantially unplasticizable, normally strong and stiff polyamide wherein the plasticized component serves as a carrying agent for the plasticizer. I find that by using the plasticized component as the carrying agent, I am able to plasticize the total mass of material while preserving and improving the strength which is normally characteristic of unplasticized polyamides.

While the invention is applicable to polyamides in general, it is particularly useful in improving those extrudable homopolymers which are inherently strong and stiff, but are incapable by themselves of absorbing conventional nylon plasticizers to any practical degree. Examples of such polyamides are on the one hand those derived from omega-aminocarboxylic acids or their lactams, such as the 6-nylon (polycaprolactam), 7-nylon (polyheptanolactam or polyoenanth lactam), 8-nylon (polycapryl lactam), 11-nylon (polyundecanoic amide), and on the other hand diamine/dicarboxylic acid polyamides such as 66-nylon or polyhexamethylene adipamide, 610-nylon or polyhexamethylene sebacamide and many others.

While there is wide latitude in the choice of the plasticizer carrying copolyamide or interpolyamide, the ones useful in this invention must be essentially water-insoluble and must absorb plasticizers.

In regard to the plasticizing component, any plasticizer that is compatible with the nylon copolymer or interpolymer, but does not make the nylon water susceptible, may be employed. The physical plasticizer as comprehended herein is commonly referred to as an "external" plasticizer. The more effective of these plasticizers show further improvement by way of imparting increased flexibility or maintaining the desired flexibility with lesser required quantity thereof, yet not causing the polyamide product of the invention to assume a rubbery character. Examples of suitable plasticizers are diols such as diethylene glycol and 2-ethylhexanediol, alkylarylsulfonamides, particularly N-substituted materials, high-boiling alcohols such as abietyl alcohol and amylcyclohexanol, organic phosphates, esters of para-salicylic acid, and certain relatively innocuous high-boiling substituted phenols such as dibenzyl phenol and isododecyl phenol.

The process of forming the improved monofilament is outlined in the attached drawing.

This invention will be better explained by the following examples:

EXAMPLE 1

A 6/610/66 polyamide copolymer or copolyamide consisting of the reaction product of 45% caprolactam, 45% hexamethylene sebacamide, and 10% hexamethylene adipamide was plasticized with 2-ethyl-1,3-hexanediol to form a plasticized material containing 14% diol plasticizer. This material which is available commercially such as from E. I. du Pont de Nemours & Company of Wilmington, Delaware, under the name "Nylon 69," is arbitrarily called "Copolymer Q," the commercial product containing the plasticizer as indicated. Varying amounts of Copolymer Q were physically mixed with polycaprolactam molding pellets in the proportions shown in Table I. The mixtures were fed to a screw extruder and extruded into a filament which was cooled and oriented (stretched), according to the process of the attached drawing, to obtain the maximum possible strength in each case. Polycaprolactam and Copolymer Q were also extruded into oriented filaments. The material in the extruder was heated to approximately 475° F. and was permitted to remain no longer than a few minutes in its molten state while proceeding through the auger of a standard extruder, following which the material was immediately chilled and stretched. The diameter of the stretched monofilament in this example was 0.028 inch. Strength tests were obtained by straight tensile pull in a Dillon tensile testing machine, while the limpness was determined on a Gurley stiffness testing machine which has a standardized scale reading in degrees of stiffness with increasing magnitude.

*Table I*

| Percent polycaprolactam | Percent copolymer Q | Percent plasticizer content in filament | Filament diameter in inches | Strength in pounds | Stiffness (Gurley stiffness testing machine) |
|---|---|---|---|---|---|
| 100 | 0   | .0   | .028 | 63 | 6⅜ |
| 90  | 10  | 1.4  | .028 | 68 | 5⅝ |
| 80  | 20  | 2.8  | .028 | 71 | 5 |
| 70  | 30  | 4.2  | .028 | 76 | 3⅝ |
| 60  | 40  | 5.6  | .028 | 72 | 3¼ |
| 50  | 50  | 7.0  | .028 | 70 | 3¼ |
| 40  | 60  | 8.4  | .028 | 68 | 1¾ |
| 30  | 70  | 9.8  | .028 | 55 | 1½ |
| 0   | 100 | 14.0 | .028 | 44 | ¾ |

It will be noted that the addition of increasing amounts of Copolymer Q increased the limpness of the fishline, and that the addition of this Copolymer Q in quantities up to 60% of the total mixture resulted in no loss of tensile strength. On the contrary, with this process it is possible to produce material stronger even than polycaprolactam alone, but with less than half the stiffness. When 70% or more of the plasticized polyamide copolymer was used, the stretchability of the filament increased considerably so as to make it impractical for use as a fishing line. The lack of strength of the plasticized polyamide copolymer itself should be noted. This low tensile strength is characteristic of plasticized polyamide copolymers or interpolymers.

EXAMPLE 2

A 6/610/66 polyamide copolymer was prepared consisting of the reaction product of 45% caprolactam, 45% hexamethylene sebacamide, and 10% hexamethylene adipamide. This polyamide copolymer was readily plasticized with 2-ethyl-1, 3-hexanediol, and a plasticized polyamide copolymer containing 14% plasticizer (86 parts copolyamide and 14 parts diol) will again arbitrarily be called "Copolymer Q" which is available commercially from the E. I. duPont de Nemours & Company of Wilmington, Delaware, under the name "Nylon 69." This Copolymer Q was mixed with polyhexamethylene sebacamide in varying amounts and extruded and oriented into a filament. The filaments were of equal diameters of 0.017 inch in each case, and were oriented by stretching to obtain maximum strength. The following results were obtained:

Table II

| Percent polyhexamethylene sebacamide | Percent copolymer Q | Percent plasticized content in filament | Strength in pounds | Stiffness |
| --- | --- | --- | --- | --- |
| 100 | 0   | 0.0  | 20 | 16    |
| 90  | 10  | 1.4  | 20 | 15½   |
| 70  | 30  | 4.2  | 22 | 13½   |
| 50  | 50  | 7.0  | 22 | 12    |
| 30  | 70  | 9.8  | 26 | 7½    |
| 10  | 90  | 12.6 | 25 | 4½    |
| 0   | 100 | 14.0 | 19 | 2½    |

It will be noted that the addition of increasing amounts of Polyamide Z caused considerable improvement in the degree of limpness, and that the addition of this polyamide copolymer in proportions up to 90% resulted in an increase in strength of the filament over that made from the polymer alone. With this polyhexamethylene sebacamide process, it is therefore possible to produce a filament with less than half the stiffness of polyhexamethylene sebacamide alone, and with equal or greater strength. The stretchability of the filament increased as the Copolymer Q was added, going from 13% for the pure polyhexamethylene sebacamide to 40% for the pure Copolymer Q. The mixture of 30% polyhexamethylene sebacamide and 70% Copolymer Q exhibited an elongation of 28% at break, which is about the maximum tolerable value for fishing line. This example illustrates the usefulness of the process of the present invention with a diamine/dicarboxylic acid polyamide such as polyhexamethylene sebacamide as well as with an aminocarboxylic acid polyamide such as polycaprolactam as illustrated in Example 1.

EXAMPLE 3

A 6/610/66 polyamide copolymer was prepared consisting of the reaction product of 45% caprolactam, 45% hexamethylene sebacamide, and 10% hexamethylene adipamide. This composition is commercially available from the E. I. du Pont de Nemours & Company of Wilmington, Delaware, under the name "Nylon 63." This copolymer, the commercial product not containing a plasticizer, was plasticized with diethylene glycol to an amount of 15% of the total plasticized polyamide copolymer, which shall arbitrarily be called Copolymer R. Varying amounts of Copolymer R were added to polyhexamethylene adipamide and the mixtures were extruded as described in Example 1 to monofilaments which were oriented by stretching to maximum strength. The final diameters of the monofilaments were 0.017 inch.

Table III

| Percent polyhexamethylene adipamide | Percent copolymer R | Strength in pounds | Stiffness |
| --- | --- | --- | --- |
| 100 | 0   | 24 | 16.4 |
| 90  | 10  | 26 | 14.0 |
| 80  | 20  | 27 | 10.8 |
| 70  | 30  | 26 | 10.8 |
| 60  | 40  | 23 | 6.4  |
| 30  | 70  | 22 | 4.0  |
| 0   | 100 | 24 | 3.8  |

This example demonstrates that the addition of a plasticized polyamide copolymer to polyhexamethylene adipamide causes improvements in the degree of limpness of the monofilament. It should again be noted that a monofilament can be made from a mixture of a homopolymer and a plasticized polyamide copolymer in which the strength is increased over that of either the homopolymer itself or of the plasticized copolymer.

EXAMPLE 4

(a) A physical mixture consisting of the reaction product of 45% caprolactam, 45% hexamethylene sebacamide and 10% hexamethylene adipamide was prepared. This product is available commercially as "Nylon 63" as hereinabove indicated. Seven parts of 2-ethyl-1,3-hexane diol were added to 93 parts of this mixture to give a 7% plasticizer content, and the mixture was extruded on the screw extruder. The material was most difficult to feed to the extruder and great difficulty was encountered in trying to produce filament of uniform size due to the non-homogeneity of the extruded material. The filament produced had a low tensile strength.

(b) Another mixture of polyamides was prepared in the same proportions as in Example 4(a). In this case, half the mixture was interpolymerized, and the plasticizer absorbed by the polyamide copolymer formed thereby. Both halves were mixed together and extruded into a monofilament on a screw extruder, without difficulty, producing a smooth homogeneous material. The monofilament was oriented after cooling, to produce a strong soft filament which made an excellent fishing line.

This example illustrates the advantage of using a polyamide copolymer as a carrying agent for plasticizer, both from the improvement in ease of production and the improvement in the final product.

EXAMPLE 5

A 6/610/66 polyamide copolymer was prepared consisting of the reaction product of 45% caprolactam, 45% hexamethylene sebacamide, and 10% hexamethylene adipamide, as described in earlier examples. Half of the polyamide copolymer was plasticized with 2-ethyl-1,3-hexanediol in an amount equal to 25% by weight of the plasticized polyamide copolymer. The other half of the copolymer polyamide was plasticized in the same manner but so as to contain 14% plasticizer polyamide. Each plasticized copolymer was mixed with a sufficient quantity of polycaprolactam so that the amount of plasticizer in the final mixture amounted to 7% by weight of the total mixture. These mixtures, therefore, contained approximately 28% and 50% respectively of polyamide copolymer. Each mixture was extruded and oriented to obtain monofilament of maximum strength, and the filaments thus produced were found to have about the same properties of strength and flexibility. This example shows how the polyamide copolymers serve as a carrier for the plasticizer, and the results are similar so long as the amount of poyamide copolymer is present in sufficient quantity to absorb the plasticizer, but not in such amount as to cause objectionable stretchability or loss of strength.

EXAMPLE 6

2-ethyl-1,3-hexanediol was mixed with polycaprolactam alone in a proportion of 15 parts by weight of the diol plasticizer to 100 parts by weight of polycaprolactam. Inasmuch as the polycaprolactam would not absorb the plasticizer upon standing in contact therewith, the mixture was extruded from a screw extruder in an effort to get the polycaprolactam to absorb the plasticizer. It was noted that only a small amount of plasticizer was absorbed by the homopolymer and most of the plasticizer fed back through the feed opening.

The same experiment was conducted using 30 parts by weight of 2-ethyl-1,3-hexanediol to 100 parts by weight of polycaprolactam. It was again noted that only a small part of the plasticizer was absorbed. These materials were each extruded from a screw extruder, and oriented into a filament having a diameter of 0.017 inch. The resultant filaments were almost identical, with a Gurley stiffness of approximately 5.4, as compared with 6.0 for a filament of the same size made from polycaprolactam alone.

Fifty parts of a 6/610/66 (9:9:2) polyamide copolymer consisting of the reaction product of 45% caprolactam, 45% hexamethylene sebacamide, and 10% hexamethylene adipamide, were added to fifty parts of polycaprolactam and to this mixture was further added 7 parts by weight of 2-ethyl-1,3-hexanediol. This mixture was extruded and oriented in the same manner as described above for the polycaprolactam. A soft filament with a stiffness of only 2.8 was readily obtained. This filament had a strength greater than polycaprolactam filament alone, and made an excellent fishing line. This example shows how a polyamide copolymer or interpolymer, can serve to absorb a plasticizer and carry it into a polyamide which by itself will not absorb said plasticizer in sufficient quantities to gain the desired flexibility or limpness.

From the foregoing examples, it can be seen that it is difficult, if not impossible, to plasticize sufficiently polyamides of this class of synthetic linear polymeric materials standing alone, to obtain a soft, strong, flexible material without objectionable stretchability, and without a tendency for the plasticizer to leach out of the polymer.

Likewise, although polyamide copolymers can easily be plasticized, they are characterized by the lack of tensile strength and have objectionable stretchability.

However, by practicing the teachings of the present invention both increased strength and flexibility can be obtained without introducing undesirable stretchability.

While my invention is particularly useful in the manufacture of fishline, it is evident to those skilled in the art that my process to increase the limpness of a polyamide structure while maintaining or even increasing the strength of the material will be extremely useful in many applications such as yarn, fibers, monofilaments in general, bristles, film, sheet, tubes, etc.

What I claim is:

1. A strong and flexible oriented structure produced from a substantially externally unplasticizable synthetic linear polyamide mixed in homogeneous fusion with an externally plasticized polyamide copolymer.

2. A strong and flexible oriented structure produced from a substantially externally unplasticizable synthetic linear polyamide mixed in homogeneous fusion with an externally plasticized polyamide copolymer in the amount of from 10% to 70% of the total mixture.

3. An oriented polyamide structure comprising a homogeneously fused mixture of polycaprolactam and an externally plasticized polyamide copolymer in the amount of from 10% to 70% of the total mixture, said externally plasticized polyamide copolymer consisting of the reaction product of approximately 45% caprolactam, 10% hexamethylene adipamide and 45% hexamethylene sebacamide.

4. A homogeneous oriented polyamide structure comprising a strong synthetic linear polyamide which is substantially unplastizable by means of external plasticizers, a polyamide copolymer characterized by its water insolubility and its capability of absorbing such external plasticizers, and a quantity of external plasticizer absorbed into the total structure and homogeneously fused therewith whereby to yield improved strength and limpness over the same mixture if chemically interpolymerized.

5. An oriented polyamide structure comprising a homogeneously fused mixture of polycaprolactam and an externally plasticized polyamide interpolymer in the amount of from 10 percent to 70 percent of the total mixture, said externally plasticized polyamide interpolymer portion consisting of a polymerized reactant product of approximately 45 percent caprolactam, 10 percent hexamethylene adipamide and 45 percent hexamethylene sebacamide, and 2-ethyl-1,3-hexane diol as the external plasticizer.

6. A strong and flexible oriented structure produced from a substantially externally unplasticizable synthetic linear polyamide mixed in homogeneous fusion with an externally plasticized polyamide interpolymer, said external unplasticizable synthetic linear polyamide being a reactant product of homogeneous monomers and being selected from the group consisting of polycaprolactam, polyheptanolactam, polycapryl lactam, polyundecanoic amide, polyhexamethylene adipamide and polyhexamethylene sebacamide.

7. The structure as defined in claim 6 being particularly characterized in that said externally plasticized polyamide copolymer is included in the amount of from 10 percent to 70 percent of the total homogeneous fusion mixture.

8. A plasticized synthetic linear polymeric fishline consisting of an oriented filament produced from a physical homogeneously fused mixture of at least one substantially externally unplasticizable synthetic linear polyamide and an externally plasticized polyamide copolymer in which the copolymer is used as a carrier for the plasticizer in the mixture, said externally plasticized polyamide copolymer being a product of at least two reactants, wherein at least one reactant is selected from the group consisting of the omega-aminocarboxylic acid and the lactams of the omega-aminocarboxylic acids, and wherein at least one other reactant is selected from the group consisting of the diamine/dicarboxylic acid pairs.

9. An oriented polyamide structure comprising a homogeneously fused mixture of polycaprolactam and an externally plasticized polyamide copolymer, said externally plasticized polyamide copolymer being a product of at least two reactants, wherein at least one reactant is selected from the group consisting of the omega-aminocarboxylic acid and the lactams of the omega-aminocarboxylic acids, and wherein at least one other reactant is selected from the group consisting of the diamine/dicarboxylic acid pairs.

10. An oriented polyamide structure comprising a homogeneously fused mixture of polycaprolactam and an externally plasticized polyamide copolymer in the amount of from 10 percent to 70 percent of the total mixture, said externally plasticized polyamide copolymer being a product of at least two reactants, wherein at least one reactant is selected from the group consisting of the omega-aminocarboxylic acid and the lactams of the omega-aminocarboxylic acids, and wherein at least one other reactant is selected from the group consisting of the diamine/dicarboxylic acid pairs.

11. An oriented polyamide copolymer structure comprising a homogeneously fused mixture of polycaprolactam and an externally plasticized interpolymer in the amount of from 10 percent to 70 percent of the total mixture, said externally plasticized interpolymer portion of the homogeneous fused mixture consisting of a polymerized reactant product of at least two reactants, at least one reactant of said interpolymer portion being selected from the group consisting of the omega-aminocarboxylic acids and the lactams of the omega-aminocarboxylic acids, and at least one other reactant of said interpolymer portion being selected from the group consisting of the diamine/dicarboxylic acid pairs.

12. A plasticized synthetic linear polymeric fishline consisting of an oriented filament produced from a physical homogeneously fused mixture of at least one substantially externally unplasticizable synthetic linear polyamide and an externally plasticized polyamide copolymer in which the copolymer is used as a carrier for the plasticizer in the mixture, said externally plasticized polyamide copolymer being a product of at least two reactants, wherein at least one reactant may be selected from the group consisting of the omega-aminocarboxylic acids and the lactams of the omega-aminocarboxylic acids, and wherein the remaining reactants are selected from the group consisting of the diamine/dicarboxylic acid pairs.

13. An oriented polyamide structure comprising a homogeneously fused mixture of polycaprolactam and an externally plasticized polyamide copolymer, said externally plasticized polyamide copolymer being a product of at least two reactants, wherein one reactant may be selected from the group consisting of the omega-aminocarboxylic acids and the lactams of omega-aminocarboxylic acids, and wherein the remaining reactants are selected from the group consisting of the diamine/dicarboxylic acid pairs.

References Cited by the Examiner
UNITED STATES PATENTS

| | | | |
|---|---|---|---|
| 2,193,529 | 3/40 | Coffman | 260—42 |
| 2,223,916 | 12/40 | Martin | 18—54 |
| 2,350,851 | 6/44 | Wehr | 18—54 |
| 2,339,237 | 1/44 | Brubaker et al. | 18—54 |
| 2,374,069 | 4/45 | Balthis | 260—34.2 |
| 2,378,977 | 6/45 | Brubaker | 260—42 |
| 2,517,694 | 8/50 | Merion et al. | 28—82 |
| 2,683,073 | 6/54 | Pierce | 18—54 |
| 2,715,763 | 8/55 | Marley | 28—82 |
| 2,733,122 | 1/56 | Herele et al. | 18—54 |

MURRAY TILLMAN, *Primary Examiner.*

W. Y. STEPHENSON, M. V. BRINDISI, LEON J. BERCOVITZ, *Examiners.*

UNITED STATES PATENT OFFICE
CERTIFICATE OF CORRECTION

Patent No. 3,182,100　　　　　　　　　　　　　　　　　　May 4, 1965

Berkley W. Bedell

It is hereby certified that error appears in the above numbered patent requiring correction and that the said Letters Patent should read as corrected below.

Column 5, lines 27 and 28, strike out "polyhexamethylene sebacamide" and insert the same after "the" in line 27, same column 5; column 6, line 53, for "poyamide" read -- polyamide --.

Signed and sealed this 19th day of October 1965.

SEAL)
Attest:

ERNEST W. SWIDER　　　　　　　　　　　　　　　　EDWARD J. BRENNER
Attesting Officer　　　　　　　　　　　　　　　　Commissioner of Patents